United States Patent
Zhao

(10) Patent No.: US 12,513,686 B2
(45) Date of Patent: Dec. 30, 2025

(54) METHOD AND DEVICE FOR COMMUNICATION

(71) Applicant: GUANGDONG OPPO MOBILE TELECOMMUNICATIONS CORP., LTD., Dongguan (CN)

(72) Inventor: Zhenshan Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 438 days.

(21) Appl. No.: 18/091,330

(22) Filed: Dec. 29, 2022

(65) Prior Publication Data
US 2023/0189248 A1  Jun. 15, 2023

Related U.S. Application Data

(63) Continuation of application No. PCT/CN2020/105614, filed on Jul. 29, 2020.

(51) Int. Cl.
*H04W 72/121* (2023.01)
*H04W 72/40* (2023.01)

(52) U.S. Cl.
CPC ......... *H04W 72/121* (2013.01); *H04W 72/40* (2023.01)

(58) Field of Classification Search
CPC ............................ H04W 72/121; H04W 72/40
See application file for complete search history.

(56) References Cited

U.S. PATENT DOCUMENTS

| 11,974,278 | B2* | 4/2024 | Yang ................ H04W 4/08 |
| 2012/0106517 | A1 | 5/2012 | Charbit et al. |
| 2017/0195993 | A1 | 7/2017 | Cole et al. |
| 2021/0321348 | A1* | 10/2021 | Ohara ................ H04L 5/14 |
| 2022/0345942 | A1* | 10/2022 | Xu ................ H04W 72/53 |

FOREIGN PATENT DOCUMENTS

| CN | 1678996 A | 10/2005 |
| CN | 104185281 A | 12/2014 |
| CN | 104052705 B | 3/2018 |
| CN | 109587790 A | 4/2019 |
| CN | 109892000 A | 6/2019 |
| CN | 106105366 B | 10/2019 |
| CN | 110380814 A | 10/2019 |
| CN | 110545524 A | 12/2019 |

(Continued)

OTHER PUBLICATIONS

First Office Action issued in corresponding Indian application No. 202327003209, mailed Mar. 11, 2024.

(Continued)

*Primary Examiner* — Won Tae C Kim
(74) *Attorney, Agent, or Firm* — BAYES PLLC

(57) ABSTRACT

A communication method, applied to a second communication device in a second communication group, include: sending second indication information to a first communication device in a first communication group, wherein the second indication information is used for determining first transmission resource set of the first communication group, and transmission resource sets are different between respective communication groups within a communication range of the first communication group.

18 Claims, 5 Drawing Sheets

(56) References Cited

FOREIGN PATENT DOCUMENTS

| CN | 110945936 A | 3/2020 |
|----|-------------|--------|
| CN | 111277949 A | 6/2020 |
| CN | 111278108 A | 6/2020 |

OTHER PUBLICATIONS

First Office Action issued in corresponding European application No. 20947375.0, mailed May 21, 2024.
First Office Action issued in corresponding Chinese Application No. 202080099572.3, mailed on Jan. 10, 2025, 21 pages.
International Search Report issued in International application No. PCT/CN2020/105614, mailed Apr. 26, 2021.
Written Opinion of the International Searching Authority issued in International application No. PCT/CN2020/105614, mailed Apr. 26, 2021.
Extended European Search Report issued in corresponding European application No. 20947375.0, mailed Aug. 10, 2023.
Notice of Reasons for Refusal issued in corresponding Japanese Application No. 2023-503245, mailed on Jul. 16, 2024, 15 pages.
"Designs for NR V2X Mode 2 Resource Allocation", Source: Fraunhofer HHI, Fraunhofer IIS, Agenda item: 7.2.4.1.4, 3GPP TSG RAN WG1 Meeting #95, R1-1812399, Spokane, USA, Nov. 12-16, 2018, 10 pages.
"D2D communication channel access", Source: Broadcom Corporation, Agenda item: 6.2.8.1.3, 3GPP TSG-RAN WG1 Meeting #75, R1-135543, San Francisco, Nov. 11-15, 2013, 4 pages.
Request for the Submission of an Opinion issued in corresponding Korean Application No. 10-2023-7005460, mailed on Jul. 14, 2025, 11 pages.

\* cited by examiner

METHOD AND DEVICE FOR COMMUNICATION

CROSS-REFERENCE TO RELATED APPLICATION

This application is a continuation of PCT application No. PCT/CN2020/105614, filed Jul. 29, 2020, entitled "METHOD AND DEVICE FOR COMMUNICATION," which is hereby incorporated by reference in its entirety.

TECHNICAL FIELD

This application relates to the field of information technology, and in particular, to a communication method and device.

BACKGROUND

In related art, terminals may be divided into different communication groups, and the terminals in each communication group communicate with each other directly. However, if there are multiple communication groups in one area, and the multiple communication groups perform communication by using the same carrier, a problem of mutual interference may occur between the communication groups.

SUMMARY

Embodiments of this application provide a communication method and a communication apparatus to solve the problem of mutual interference between communication groups in the related art.

According to a first aspect of this application, a communication method is provided, applied to a first communication device in a first communication group, and includes:
  determining, according to a first transmission resource set of the first communication group, transmission resources of communication devices in the first communication group, where transmission resource sets are different between respective communication groups within a communication range of the first communication group; and
  sending first indication information to the communication devices in the first communication group, where the first indication information is used for indicating the transmission resources of the communication devices in the first communication group.
  In some embodiments, the method further includes:
  acquiring pre-configuration information of the first communication device in the first communication group; and
  determining the first transmission resource set according to the pre-configuration information of the first communication device in the first communication group.
  In some embodiments, the preconfigured information includes at least one of: a number of terminals in the first communication group, a type of the terminals in the first communication group, a service attribute parameter of the first communication group.
  In some embodiments, the method further includes:
  receiving second indication information sent by a second communication device in a second communication group, where the second indication information includes available transmission resources of the first communication group; and
  determining the first transmission resource set according to the second indication information.
  In some embodiments, the second indication information is carried in broadcast information, system information, radio resource control (RRC) signaling or control signaling.
  In some embodiments, the method further includes:
  receiving synchronization signal and the broadcast information sent by the second communication device in the second communication group.
  In some embodiments, the method further includes:
  sending a resource change request to the second communication device in the second communication group, where the resource change request is used for requesting, changing or cancelling the transmission resources of the first communication group, and the resource change request includes information on the first communication group.
  In some embodiments, the information on the first communication group includes at least one of: identification information of the first communication group, identification information of the first communication device in the first communication group, a number of terminals in the first communication group, and a service attribute parameter of the first communication group.
  In some embodiments, the service attribute parameter of the first communication group includes at least one of: data packet size, packet sending frequency, transmission reliability, transmission rate and transmission delay.
  In some embodiments, the first transmission resource set is used for indicating available transmission resources of the first communication group or unavailable transmission resources of the first communication group.
  In some embodiments, the first transmission resource set includes time domain resource information and/or frequency-domain resource information.

According to a second aspect of this application, a communication method is provided, applied to a second communication device in a second communication group, and includes:
  sending second indication information to a first communication device in a first communication group, where the second indication information is used for determining first transmission resource set of the first communication group, and transmission resource sets are different between respective communication groups within a communication range of the first communication group.
  In some embodiments, the second indication information is carried in broadcast information, system information, radio resource control (RRC) signaling or control signaling.
  In some embodiments, the method further includes:
  receiving a resource change request sent by the first communication device in the first communication group, where the resource change request is used for requesting, changing or cancelling transmission resources of the first communication group, and the resource change request includes information on the first communication group; and
  determining, according to the information on the first communication group, available transmission resources of the first communication group.
  In some embodiments, the information on the first communication group includes at least one of: identification information of the first communication group, identification information of the first communication device in the first communication group, a number of terminals in the first communication group, and a service attribute parameter of the first communication group.

In some embodiments, the service attribute parameter of the first communication group includes at least one of: data packet size, packet sending frequency, transmission reliability, transmission rate and transmission delay.

In some embodiments, the method further includes:
updating a second transmission resource set of the second communication group according to the first transmission resource set; and
sending third indication information to communication devices in the second communication group, where the third indication information is used for indicating updated transmission resources of the communication devices in the second communication group.

In some embodiments, the first transmission resource set is used for indicating available transmission resources of the first communication group or unavailable transmission resources of the first communication group.

In some embodiments, the first transmission resource set includes time domain resource information and/or frequency-domain resource information.

According to a third aspect of this application, a communication apparatus is provided and includes:
a processing module, configured to determine, according to a first transmission resource set of the first communication group, transmission resources of communication devices in the first communication group, where transmission resource sets are different between respective communication groups within a communication range of the first communication group; and
a sending module, configured to send first indication information to the communication devices in the first communication group, where the first indication information is used for indicating the transmission resources of the communication devices in the first communication group.

In some embodiments, the processing module is further configured to acquire pre-configuration information of the communication apparatus; and determine the first transmission resource set according to the pre-configuration information of the communication apparatus.

In some embodiments, the preconfigured information includes at least one of: a number of terminals in the first communication group, a type of the terminals in the first communication group, a service attribute parameter of the first communication group.

In some embodiments, the apparatus further includes:
a receiving module, configured to receive second indication information sent by a second communication device in a second communication group, where the second indication information includes available transmission resources of the first communication group; and
where the processing module is further configured to determine the first transmission resource set according to the second indication information.

In some embodiments, the second indication information is carried in broadcast information, system information, radio resource control (RRC) signaling or control signaling.

In some embodiments, the receiving module is further configured to receive synchronization signal and the broadcast information sent by the second communication device in the second communication group.

In some embodiments, the sending module is further configured to send a resource change request to the second communication device in the second communication group, where the resource change request is used for requesting, changing or cancelling the transmission resources of the first communication group, and the resource change request includes information on the first communication group.

In some embodiments, the information on the first communication group includes at least one of: identification information of the first communication group, identification information of a first communication device in the first communication group, a number of terminals in the first communication group, and a service attribute parameter of the first communication group.

In some embodiments, the service attribute parameter of the first communication group includes at least one of: data packet size, packet sending frequency, transmission reliability, transmission rate and transmission delay.

In some embodiments, the first transmission resource set is used for indicating available transmission resources of the first communication group or unavailable transmission resources of the first communication group.

In some embodiments, the first transmission resource set includes time domain resource information and/or frequency-domain resource information.

According to a fourth aspect of this application, a communication apparatus is provided and includes:
a sending module, configured to send second indication information to a first communication device in a first communication group, where the second indication information is used for determining first transmission resource set of the first communication group, and transmission resource sets are different between respective communication groups within a communication range of the first communication group.

In some embodiments, the second indication information is carried in broadcast information, system information, radio resource control (RRC) signaling or control signaling.

In some embodiments, the apparatus further includes:
a receiving module, configured to receive a resource change request sent by the first communication device in the first communication group, where the resource change request is used for requesting, changing or cancelling transmission resources of the first communication group, and the resource change request includes information on the first communication group; and
a processing module, configured to determine, according to the information on the first communication group, available transmission resources of the first communication group.

In some embodiments, the information on the first communication group includes at least one of: identification information of the first communication group, identification information of the first communication device in the first communication group, a number of terminals in the first communication group, and a service attribute parameter of the first communication group.

In some embodiments, the service attribute parameter of the first communication group includes at least one of: data packet size, packet sending frequency, transmission reliability, transmission rate and transmission delay.

In some embodiments, the processing module is further configured to update a second transmission resource set of the second communication group according to the first transmission resource set; and
where the sending module is further configured to send third indication information to communication devices in the second communication group, where the third indication information is used for indicating updated transmission resources of the communication devices in the second communication group.

In some embodiments, the first transmission resource set is used for indicating available transmission resources of the first communication group or unavailable transmission resources of the first communication group.

In some embodiments, the first transmission resource set includes time domain resource information and/or frequency-domain resource information.

According to a fifth aspect of this application, a communication device is provided and includes: a processor, a memory, a transmitter and a receiver;

where the memory is configured to store a computer program, and the processor is configured to call and run the computer program stored in the memory, thereby implementing the method according to the first or second aspect; and where the transmitter is configured to perform sending actions of the processor, and the receiver is configured to perform receiving actions of the processor.

According to a sixth aspect of this application, a chip is provided and includes: a processor configured to call and run a computer program from a memory, thereby causing a device installed with the chip to implement the method according to the first or second aspect.

According to a seventh aspect of this application, a computer-readable storage medium is provided and used for storing a computer program, where the computer program causes a computer to implement the method according to the first or second aspect.

According to an eighth aspect of this application, a computer program product is provided and includes computer program information used for causing a computer to implement the method according to the first or second aspect.

According to a ninth aspect of this application, a computer program is provided and causes a computer to implement the method according to the first or second aspect.

According to the communication method and apparatus provided by the embodiments of this application, which may be applied to a first communication device in a first communication group, the transmission resources of communication devices in the first communication group are determined according to the first transmission resource set of the first communication group, where transmission resource sets are different between respective communication groups within the communication range of the first communication group. Then, first indication information is sent to the communication devices in the first communication group, where the first indication information is used for indicating transmission resources of the communication devices in the first communication group. Compared with the related art, since the transmission resource sets are different among the respective communication groups, resource coordination can be realized among the communication groups, thereby avoiding the interference between the communication groups.

BRIEF DESCRIPTION OF THE DRAWINGS

In order to explain the technical solutions in this application or the related art more clearly, the following will briefly introduce the accompanying drawings that need to be used in the description of the embodiments or the related art. Obviously, the accompanying drawings in the following description illustrate only some embodiments of this application, for those of ordinary skill in the art, other drawings can also be obtained from these drawings without any creative effort.

DETAILED DESCRIPTION

In order to make the objectives, technical solutions and advantages of this application clearer, the technical solutions in the embodiments of this application will be clearly and completely described below with reference to the accompanying drawings in the embodiments of this application. Obviously, the described embodiments are only some, but not all, embodiments of this application. Based on the embodiments of this application, all other embodiments obtained by those of ordinary skill in the art without creative efforts shall fall within the protection scope of this application.

Figure 1:
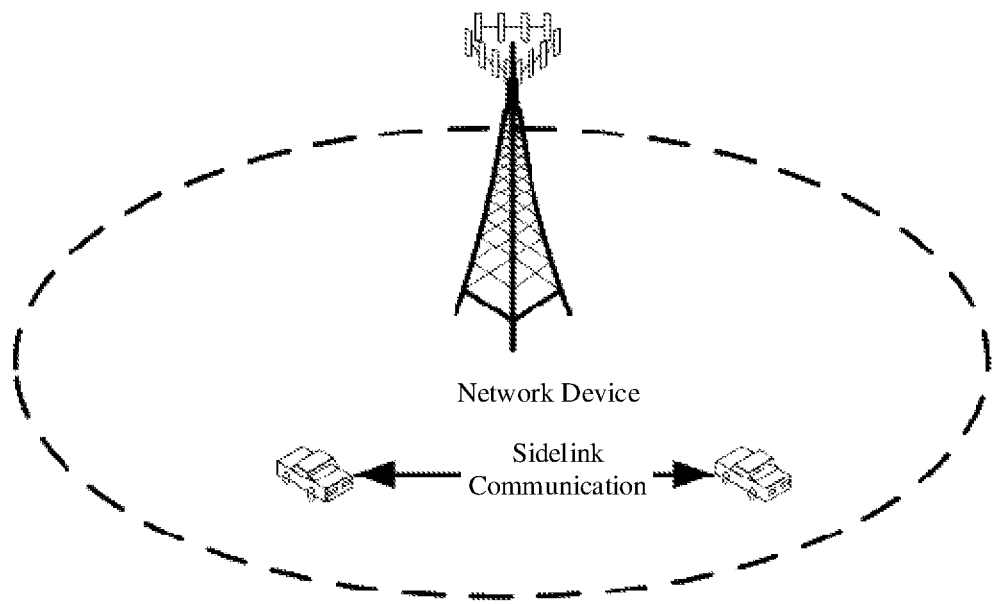
FIG. 1 is a schematic diagram of sidelink communication within a network coverage according to some embodiments of this application.
Figure 2:
FIG. 2 is a schematic diagram of sidelink communication partially within the network coverage according to some embodiments of this application.
Figure 3:
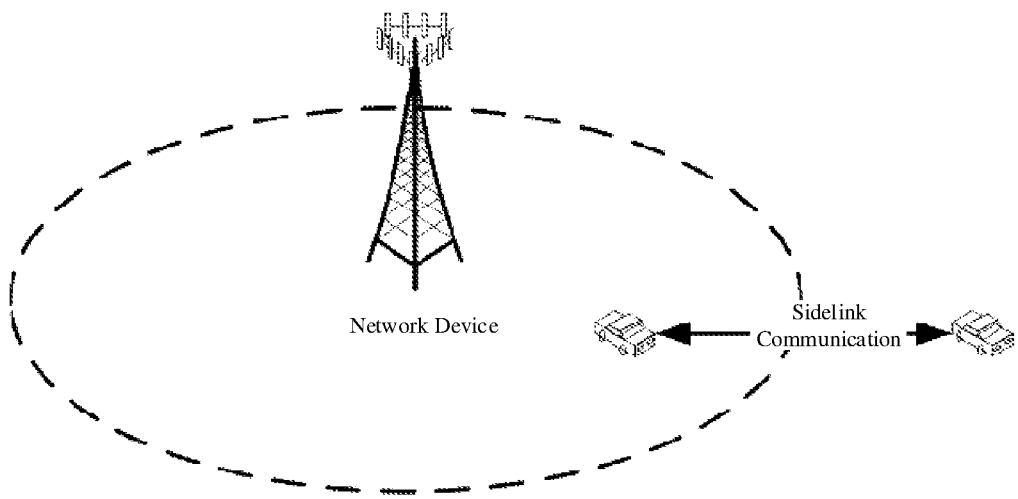
FIG. 3 is a schematic diagram of sidelink communication outside the network coverage according to some embodiments of this application.
Figure 4:
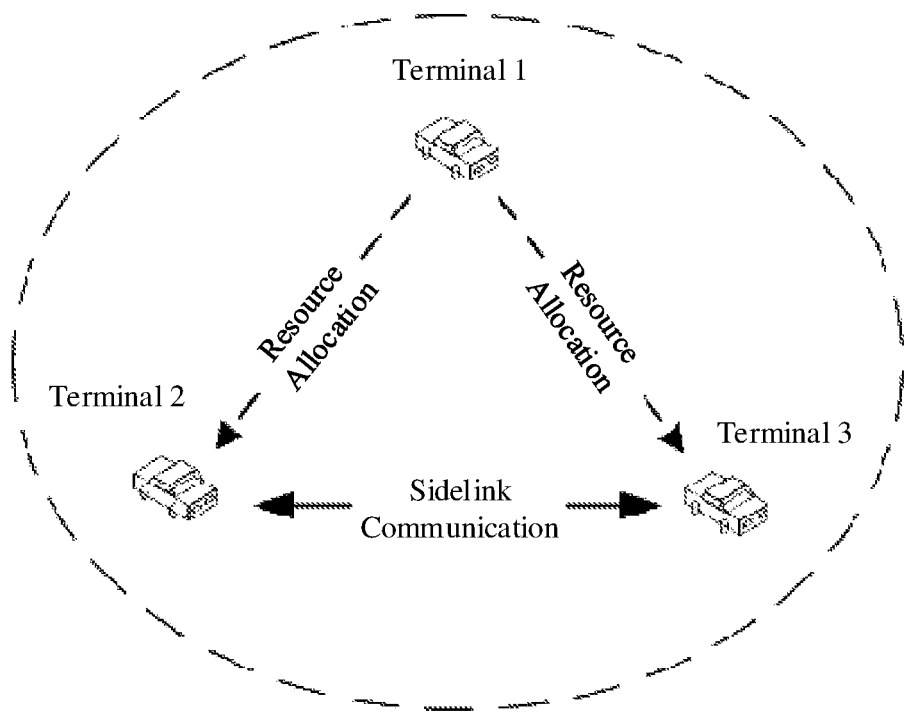
FIG. 4 is a schematic diagram of sidelink communication outside the network coverage according to some other embodiments of this application.

In sidelink communication, based on the network coverage of the communicating terminal, sidelink communication may be divided into sidelink communication within the network coverage, sidelink communication partially within the network coverage, and sidelink communication outside the network coverage. FIG. 1 is a schematic diagram of sidelink communication within the network coverage according to some embodiments of this application: FIG. 2 is a schematic diagram of sidelink communication partially within the network coverage according to some embodiments of this application; FIG. 3 is a schematic diagram of sidelink communication outside the network coverage according to some embodiments of this application; and FIG. 4 is a schematic diagram of sidelink communication outside the network coverage according to some other embodiments of this application.

As shown in FIG. 1, in the communication within the network coverage, all the terminals performing the sidelink communication are within the coverage of the same network device. Those terminals may perform the sidelink communication based on the same sidelink configuration by receiving configuration signaling from the network device.

As shown in FIG. 2, in the case of sidelink communication partially within the network coverage, some terminals performing sidelink communication are located within the coverage of a network device, and the terminals located within the coverage of the network device can receive the configuration signaling of the network device, so as to perform sidelink communication according to the configuration of the base station. However, the terminal outside the network coverage cannot receive the configuration signaling of the network device. Accordingly, the terminal outside the network coverage may determine the sidelink configuration according to pre-configuration information and information carried in the physical sidelink broadcast channel (PSBCH) sent by the terminal within the network coverage, thereby performing the sidelink communication.

As shown in FIG. 3, in the case of sidelink communication outside the network coverage, all the terminals performing the sidelink communication are located outside the network coverage, and then all the terminals determine the sidelink configuration according to the pre-configuration information, thereby performing the sidelink communication.

As shown in FIG. 4, in the case of sidelink communication outside the network coverage, if multiple terminals are classified into a communication group, and the communication group is provided with a cluster header (CH), then the cluster header may determine joining and leaving of group member terminals, perform resource coordination within the communication group, allocate transmission resources to group member terminals, and receive feedback information from group member terminals. The cluster header may also be referred to as a central control node.

In the related art, each terminal in the Internet of vehicles (IoV) system may be divided into multiple different communication groups as shown in FIG. 4, and the terminals in each communication group may communicate with each other directly in a D2D manner. There may be one cluster header in each communication group, and the cluster header controls other terminals in the communication group, such as allocating transmission resources to other terminals, forwarding data between terminals, and so on.

However, if there are multiple communication groups in one area, and if the multiple communication groups use the same carrier for communication, there may be a problem of mutual interference between the communication groups.

In order to solve the above problem, some embodiments of this application provide a communication method and apparatus, so as to solve the problem of mutual interference between communication groups in the related art. The inventive concept of this application is to configure different transmission resources for respective communication groups of the system, so that resource coordination can be realized among the communication groups, thereby avoiding the interference between the communication groups.

The application scenarios of this application are described below.

The first available application scenario of some embodiments of this application is the application scenario of the IoV system. Exemplarily, a plurality of vehicles may form a communication group, each communication group is provided with a vehicle as the cluster header, and the cluster header allocates transmission resources for the communication devices in the group. When there are multiple communication groups in the IoV system, resources may be coordinated among multiple communication groups.

The second available application scenario of some embodiments of this application is the application scenario of in-vehicle communication. Exemplarily, various terminals are included in a vehicle, such as speakers, stereos, cameras, rear-view mirrors, and the like. In some embodiments, the telematics box (T-BOX) in the vehicle may form a communication group with the microphone, speaker in the vehicle: the vehicle controller may form a communication group with the windows, doors, lights, seats, and the like; the central controller in the vehicle may form a communication group with microphones, speakers, rear-view mirrors, and the like; and the passive entry passive start (PEPS) may form a communication group with door locks, keys, and the like.

The third available application scenario of some embodiments of this application is the application scenario of the Internet of Things (IoT). Exemplarily, in a smart home scenario, household or indoor terminals have the communication function, and at least one communication group may be formed between the household terminals. For example, smart phones, smart TVs, and consumer premise equipment (CPE) may form a communication group. Terminals in the same family may form a communication group, and different families correspond to different communication groups.

The fourth available application scenario of some embodiments of this application is the application scenario of wearable devices. Exemplarily, in the wearable device scenario, at least one communication group may be formed between the wearable device and other electronic devices. For example, VR glasses worn on the head, gamepads held in the hands, game consoles and smart TVs may form a communication group: sports bracelets worn on the wrist and the user's smartphone may form a communication group. Wearable devices on the same user may belong to multiple communication groups.

It should be noted that the application scenarios involved in some embodiments of this application do not constitute limitations, and the communication methods according to some embodiments of this application may also be applied to other communication systems having multiple communication groups.

In the following, the technical solutions according to some embodiments of this application will be described in detail with specific embodiments by taking a first communication device in a first communication group and a second communication device in a second communication group as examples. The following embodiments may be combined with each other, and the same or similar concepts or processes may not be repeated in these embodiments.

Figure 5:
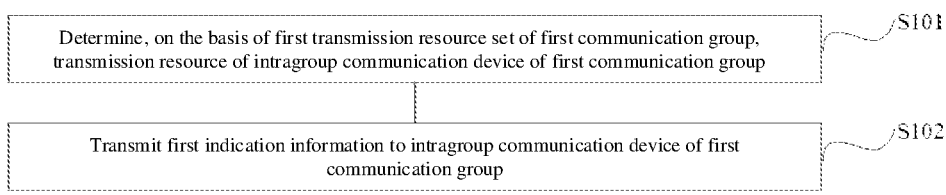
FIG. 5 is a schematic flowchart of a communication method according to some embodiments of this application.

FIG. 5 is a schematic flowchart of a communication method according to some embodiments of this application. The executer of some embodiments of this application is the first communication device in the first communication group, which involves a specific process of how the first communication device in the first communication group determines the transmission resources of the communication device in the group. As shown in FIG. 5, the method includes following steps.

In S101, the transmission resources of the communication devices in the first communication group are determined according to a first transmission resource set of the first communication group.

Herein, the transmission resource sets are different between respective communication groups within a communication range of the first communication group. The first transmission resource set may include time domain resource information and/or frequency-domain resource information.

Embodiments of this application do not limit how to determine the transmission resources of the communication devices in the first communication group according to the first transmission resource set. In some embodiments, the first transmission resource set may be used for indicating available transmission resources of the first communication group. In some other embodiments, the first transmission resource set may be used for indicating unavailable transmission resources of the first communication group.

In addition, the embodiments of this application do not limit the type of transmission resources, which may be specifically configured according to the communication mode. Exemplarily, the transmission resources may be sidelink communication transmission resources, or may be other types of transmission resources.

Moreover, the first transmission resource set may also include various information, such as time domain information, frequency domain information and cycle information. Exemplarily, the time domain information may be, for example, super frame information, radio frame information and symbol information, and the above time domain information may be indicated by bitmap information: the frequency domain information may include the starting position information and length information in the frequency domain, which may be used for determining the size of frequency domain resources; and the cycle information is used for indicating the repetition cycle of the allocated transmission resources in the time domain.

The following describes how to determine the first transmission resource set of the first communication group.

Embodiments of this application provide three modes to determine the first transmission resource set of the first communication group, including a static mode, a semi-static mode, and a dynamic mode.

Exemplarily, if the static mode is adopted, the first communication device in the first communication group may directly acquire pre-configuration information of the first communication device in the first communication group. Subsequently, the first communication device in the first communication group determines the first transmission resource set according to the pre-configuration information of the first communication device in the first communication group.

In some embodiments, the pre-configuration information is pre-stored at the first communication device in the first communication group. The pre-configuration information includes at least one of the following: the number of terminals in the first communication group, the type of terminals in the first communication group, and a service attribute parameter of the first communication group.

This application does not limit how to determine the first transmission resource set according to the preconfigured information, which may be specifically set according to the actual situation.

In some embodiments, there may be a correspondence between the number of terminals, the type of terminals and the transmission resources. After acquiring the configuration information, the first communication device in the first communication group may determine the first transmission resource set based on the number of terminals and the type of terminals.

In some embodiments, there may be a correspondence between the service attribute parameter and the transmission resources. After acquiring the configuration information, the first communication device in the first communication group may determine the first transmission resource set base on the service attribute parameter of the first communication group included in the pre-configuration information.

In some embodiments, the pre-configuration information may further include the first transmission resource set directly, and the first communication device in the first communication group may directly extract the first transmission resource set from the pre-configuration information.

Exemplarily, if the semi-static mode is adopted, the second communication device in the second communication group may send second indication information to the first communication device in the first communication group, where the second indication information is used for determining the first transmission resource set of the first communication group. Subsequently, the first communication device in the first communication group determines the first transmission resource set according to the second indication information.

In some embodiments, the second communication device in the second communication group is the general control terminal of the communication groups, and is configured to allocate transmission resources for each communication group. The second indication information may be carried in broadcast information, system information, or radio resource control (RRC) signaling.

Exemplarily, if the dynamic mode is adopted, the first communication device in the first communication group may send a resource change request to the second communication device in the second communication group, and the resource change request is used for requesting, changing or cancelling the transmission resources of the first communication group. The resource change request may include information on the first communication group. Subsequently, the second communication device in the second communication group may determine available transmission resources of the first communication group according to the information on the first communication group, and sends second indication information to the first communication device in the first communication group, where the second indication information is used for determining the first transmission resource set of the first communication group. Finally, the first communication device in the first communication group may determine the first transmission resource set according to the second indication information.

In some embodiments, the information on the first communication group includes at least one of the following: identification information of the first communication group, identification information of the first communication device in the first communication group, the number of terminals in the first communication group, and the service attribute parameter of the first communication group. The service attribute parameter of the first communication group may include at least one of the following items: data packet size, packet sending frequency, transmission reliability, transmission rate, and transmission delay.

In S102, first indication information is sent to the communication devices in the first communication group, where the first indication information is used for indicating transmission resources of the communication devices in the first communication group.

In this step, after the first communication device in the first communication group determines the transmission resources of the communication devices in the first communication group, it may send the first indication information to the communication devices in the first communication group to indicate the transmission resources of the communication devices in the first communication group.

Embodiments of this application do not limit how to send the first indication information to the communication devices in the group. Exemplarily, the first communication device in the first communication group may notify the communication devices in the group of their available transmission resources by using broadcast information, system information, RRC signaling, control signaling, and the like. The control signaling may be, for example, downlink control information (DCI) or sidelink control information (SCI), and the RRC signaling may be, for example, PC5-RRC signaling.

According to the communication method provided by the embodiments of this application, which may be applied to the first communication device in the first communication group, the transmission resources of communication devices in the first communication group are determined according to the first transmission resource set of the first communication group, where transmission resource sets are different between respective communication groups within the communication range of the first communication group. Then, the first indication information is sent to the communication devices in the first communication group, where the first indication information is used for indicating transmission resources of the communication devices in the first communication group. Compared with the related art, since the transmission resource sets are different among the respective communication groups, resource coordination can be realized among the communication groups, thereby avoiding the interference between the communication groups.

On the basis of the foregoing embodiments, if the number of terminals and service types in the communication group are known, the first transmission resource set may be determined in the static mode for specific description.

Exemplarily, for an in-vehicle short-range communication system, the wireless communication functions supported by the vehicle are all known. For example, the noise reduction function, the wireless seat control function, and the wireless ignition function all correspond to the same or different communication groups. The type and number of terminals in each communication group are also known, and the service type, data size, frequency, and the like of the data transmitted within the communication groups are also known. Accordingly, the transmission resources may be configured for each communication group by means of pre-configuration information, and a corresponding transmission resource set may be determined.

Figure 6:
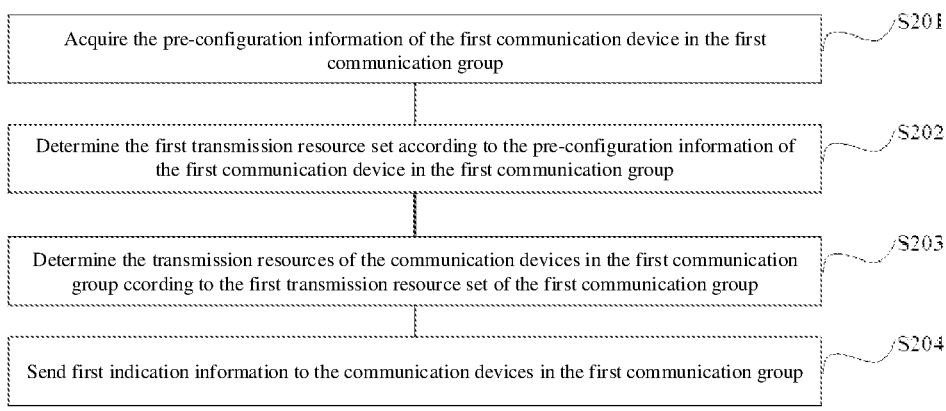
FIG. 6 is a schematic flowchart of a communication method according to some other embodiments of this application.

The following specifically describes how to determine the first transmission resource set through pre-configuration. FIG. 6 is a schematic flowchart of a communication method according to some other embodiments of this application. As shown in FIG. 6, the executer of some embodiments is the first communication device in the first communication group, and the method includes following steps.

In S201, the pre-configuration information of the first communication device in the first communication group is acquired.

In this step, the pre-configuration information may be pre-stored in a memory of the first communication device in the first communication group, and before the first communication device in the first communication group needs to perform communications, the pre-configuration information of the first communication group may be obtained from the memory of the first communication device.

The pre-configuration information may include at least one of the following: the number of terminals in the first communication group, the type of terminals in the first communication group, and a service attribute parameter of the first communication group.

It should be noted that the communication device involved in the embodiments of this application may be a terminal, such as a mobile phone, a vehicle-mounted terminal, and the like, or may be another device with specific communication functions, such as a vehicle, a wireless ignition device in the vehicle, and the like.

In S202, the first transmission resource set is determined according to the pre-configuration information of the first communication device in the first communication group.

In this step, after the first communication device in the first communication group obtains the pre-configuration information of the first communication device in the first communication group, it may determine the first transmission resource set according to the pre-configuration information of the first communication device in the first communication group.

This application does not limit how to determine the first transmission resource set according to the preconfigured information, which may be specifically implemented according to the actual situation.

In some embodiments, there is a correspondence between the number of terminals, the type of terminals and the transmission resources. After acquiring the configuration information, the first communication device in the first communication group may determine the first transmission resource set based on the number and type of the terminals in the first communication group included in the pre-configuration information.

In some embodiments, there is a correspondence between the service attribute parameter and the transmission resources. After acquiring the configuration information, the first communication device in the first communication group may determine the first transmission resource set based on the service attribute parameter of the first communication group included in the pre-configuration information.

In some embodiments, the pre-configuration information may further include the first transmission resource set directly, and the first communication device in the first communication group may directly extract the first transmission resource set from the pre-configuration information.

In some embodiments, the first transmission resource set includes the time domain resource information and/or the frequency domain resource information. In some embodiments, the first communication device in the first communication group may determine the time domain resource information based on the preconfigured information, and the time domain resource information may include super frame, radio frame or symbol information. In some other embodiments, the first communication device in the first communication group may determine the frequency domain resource information based on the preconfigured information.

Figure 7:
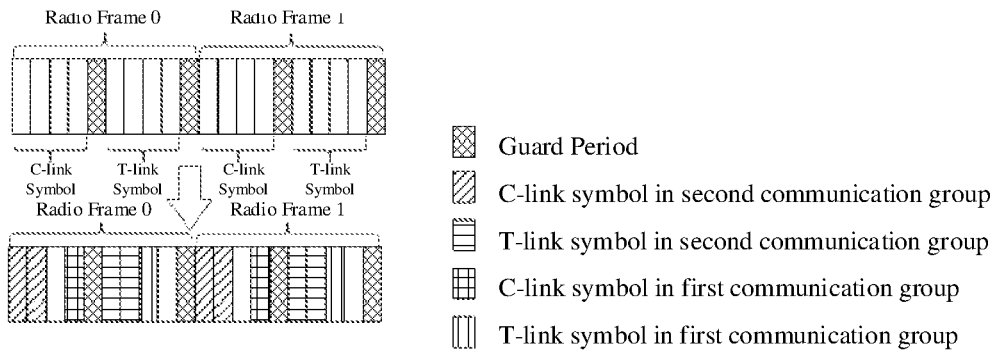
FIG. 7 is a schematic diagram illustrating configuration of symbol information in a radio frame according to some embodiments of this application.

Exemplarily, FIG. 7 is a schematic diagram illustrating configuration of symbol information in a radio frame according to some embodiments of this application. As shown in FIG. 7, for the in-vehicle short-range communication system, a radio frame includes 8 orthogonal frequency division multiplexing (OFDM) symbols. The 8 OFDM symbols are divided into C-link symbols and T-link symbols. Herein, the C-link is the link through which the cluster header sends data to the communication device in the group, and the T-link is the link through which the communication device in the group sends data to the cluster header. The C-link symbol is located at the beginning of the radio frame, and the T-link symbol is located at the end of the radio frame. There is a guard period (GP) between the C-link symbol and the T-link symbol, which is usually used for receiving-transmitting (RX-TX) conversion or TX-RX conversion. If there are two communication groups, within one radio frame, 1 C-link symbol and 1 T-link symbol may be allocated to the first communication group: 2 C-link symbols and 2 T-link symbols may be allocated to the second communication group; and the remaining 1 C-link symbol and 1 T-link symbol may be reserved for use by other communication groups, or other wireless communication systems may be introduced, or the reserved transmission resources may be used by a new wireless communication system.

In S203, the transmission resources of the communication devices in the first communication group are determined according to the first transmission resource set of the first communication group, where the transmission resource sets are different between the respective communication groups within the communication range of the first communication group.

In S204, first indication information is sent to the communication devices in the first communication group, where the first indication information is used for indicating transmission resources of the communication devices in the first communication group.

The technical terms, technical effects, technical features, and optional implementation manners of S203-204 can be understood with reference to S101-S102 shown in FIG. 5, and repeated content will not be elaborated here.

In some embodiments of this application, since the first communication device in the first communication group determines the first transmission resource set according to the pre-configuration information, the first communication device in the first communication group can determine the available transmission resources, so that each communication group has different transmission resources, resource coordination can be realized among communication groups, thereby avoiding interference between communication groups.

In the communication method shown in FIG. 6, the pre-configuration information in each communication group is preconfigured, and the transmission resources cannot be modified after being preconfigured. Accordingly, if the number of terminals in the communication group changes, the transmission resources required by the communication group may also change correspondingly, so that the preconfigured transmission resources may be unable to meet the communication requirements of the communication group.

Figure 8:
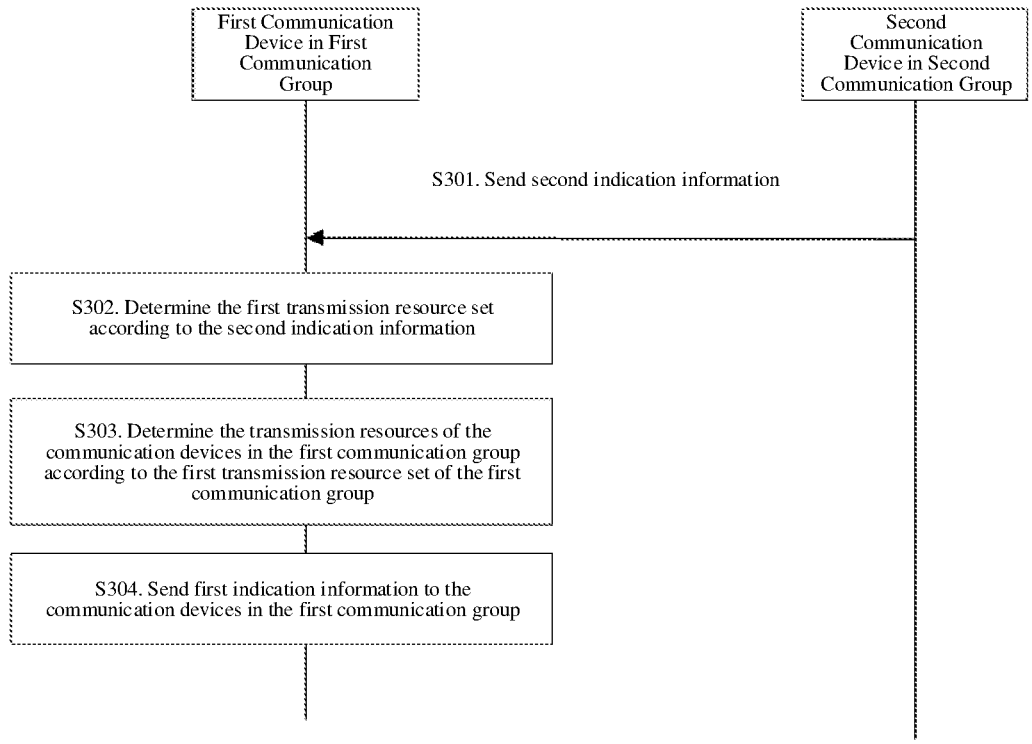
FIG. 8 is a signaling interaction diagram of the communication method according to some embodiments of this application.

On the basis of the above embodiments, the semi-static mode may be adopted in this application to avoid that the preconfigured transmission resources cannot meet the communication requirements of the communication group. The following is a specific description of how to determine the first transmission resource set in the semi-static mode. FIG. 8 is a signaling interaction diagram of the communication method according to some embodiments of this application. As shown in FIG. 8, the method includes following steps.

In S301, second communication device in the second communication group sends second indication information to the first communication device in the first communication group, where the second indication information is used for determining the first transmission resource set of the first communication group, and the transmission resource sets are different among the communication groups within the communication range.

In S302, the first communication device in the first communication group determines the first transmission resource set according to the second indication information.

In some embodiments, the second indication information may be carried in broadcast information, system information or RRC signaling.

Exemplarily, a system includes four communication groups, namely the first to fourth communication groups. The second communication device in the second communication group indicates the transmission resources for the four communication groups through the system information. The system information includes four information fields, respectively corresponding to the indication information of the transmission resources for the four communication groups. For example, the second indication information is sent to the first communication device in the first communication group, indicating the first transmission resource set of the first communication group. Before performing intra-group communication, the first communication device in the first communication group may first obtain the first transmission resource set from the second indication information, and then allocate the transmission resources within the transmission resource set to the communication devices in the group.

In some embodiments, the first communication device in the first communication group may search for synchronization signals and broadcast information sent by the second communication device in the second communication group, and the first communication device in the first communication group may directly receive the second indication information from the broadcast information.

In addition, in some other embodiments, the second communication device in the second communication group may also update the transmission resource set of each communication group by updating the system information.

In S303, the first communication device in the first communication group determines the transmission resources of the communication devices in the first communication group according to the first transmission resource set of the first communication group, where the transmission resource sets are different among respective communication groups within the communication range of the first communication group.

In S304, the first communication device in the first communication group sends first indication information to the communication devices in the first communication group, where the first indication information is used for indicating transmission resources of the communication devices in the first communication group.

The technical terms, technical effects, technical features, and optional implementations of S303-S304 can be understood with reference to S101-S102 shown in FIG. 5, and repeated content will not be elaborated here.

In some embodiments of this application, the second communication device in the second communication group sends the second indication information to the first communication device in the first communication group, and then the first communication device in the first communication group determines the first transmission resource set according to the second indication information. Since the available transmission resources of respective communication groups are broadcasted by the cluster header of a certain communication group, the transmission resources can be semi-statically configured for each communication group, and the transmission resource set of each communication group can be updated by updating the system information.

On the basis of the above-mentioned embodiments, further in some embodiments of this application, a cluster header of a communication group may be used as the control terminal of all communication groups, and configured to allocate transmission resources dynamically for all communication groups.

In some embodiments of this application, the control terminal of all the above communication groups may be the second communication device in the second communication group. Exemplarily, for an in-vehicle short-range communication system, there are multiple communication groups in the vehicle, but each communication group does not always have data transmission. For example, the data transmission of communication groups such as the wireless ignition system and the cockpit control system is triggered by events, while the communication group of the noise reduction system may always be running as long as the vehicle is in the ignition state, so as to ensure real-time reduction of the in-vehicle noise. Therefore, the cluster header of the communication group of the noise reduction system may serve as the control terminal of all communication groups, that is, the second communication device in the second communication group in this application. Subsequently, the noise reduction system communication group may allocate transmission resources for other communication groups.

Figure 9:
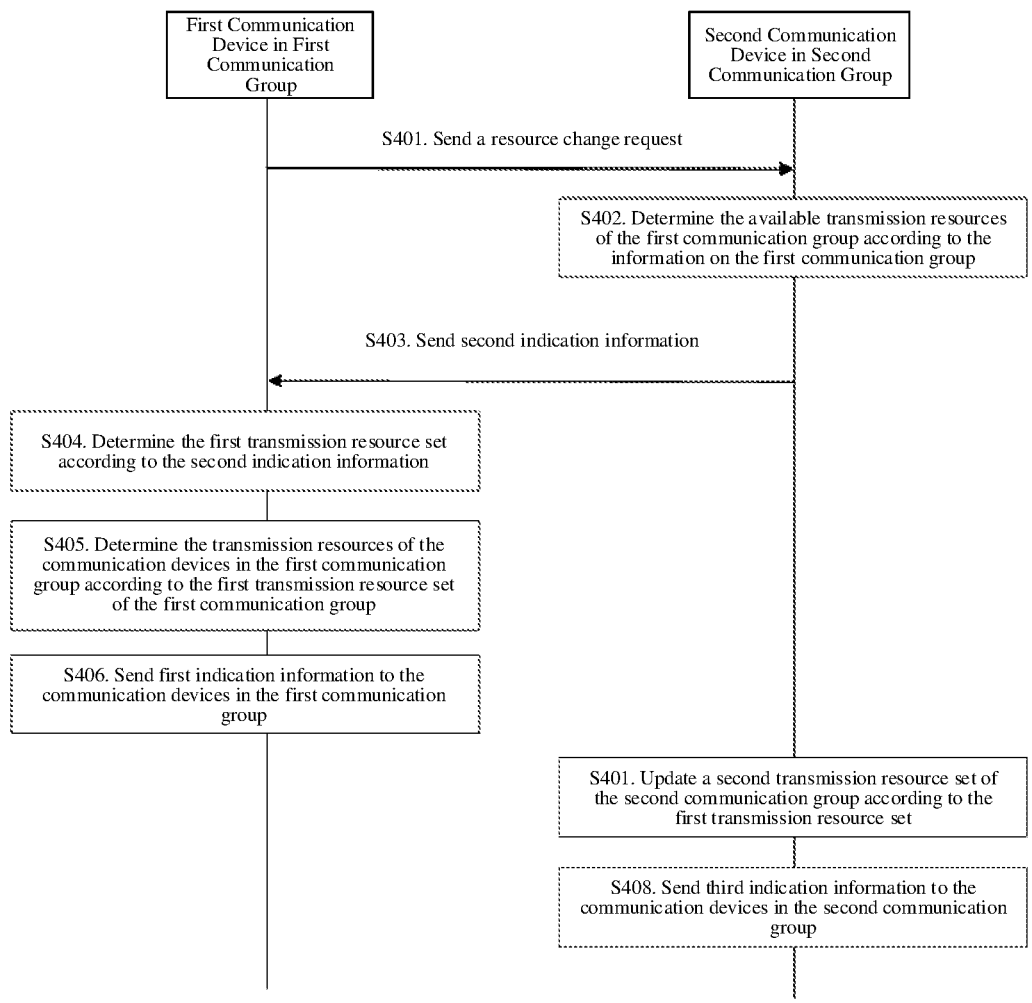
FIG. 9 is a signaling interaction diagram of the communication method according to some other embodiments of this application.

The following specifically describes how to determine the first transmission resource set in the dynamic mode. FIG. 9 is a signaling interaction diagram of the communication method according to some other embodiments of this application. As shown in FIG. 9, the method includes following steps.

In S401, the first communication device in the first communication group sends a resource change request to the second communication device in the second communication group, where the resource change request is used for requesting, changing or cancelling the transmission resources of the first communication group, and the resource change request includes information on the first communication group.

The resource change request may be used for requesting to apply for the transmission resources of the first communication group, or requesting to change the transmission resources of the first communication group, or requesting to cancel the transmission resources of the first communication group, which are not limited by embodiments of this application.

In some embodiments, when the first communication device in the first communication group needs to perform intra-group communication but has not determined available transmission resources, a resource change request may be sent to the second communication device in the second communication group to request the transmission resources for the first communication group. When the first communication device in the first communication group determines that no further communication is required in the group, a resource change request may be sent to the second communication device in the second communication group to request for cancelling the transmission resources of the first communication group. When the first communication device in the first communication group determines that the number of communication devices in the group has changed, or the transmission resources in the group are insufficient, it may send a resource change request to the second communication device in the second communication group to request for changing the transmission resources of the first communication group.

In some embodiments, before the first communication device in the first communication group sends the resource change request to the second communication device in the second communication group, the first communication device in the first communication group also needs to access the second communication device. Exemplarily, the first communication device in the first communication group searches for the synchronization signal and broadcast information sent by the second communication device in the second communication group, and then, the first communication device in the first communication group accesses in the second communication group of the second communication group via the random access resource allocated by the second communication device in the second communication group.

In S402, the second communication device in the second communication group determines the available transmission resources of the first communication group according to the information on the first communication group.

In this step, after the second communication device in the second communication group receives the resource change request sent by the first communication device in the first communication group, it can determine the available transmission resources of the first communication group according to the information on the first communication group.

The information on the first communication group includes at least one of the following: identification information of the first communication group, identification information of the first communication device in the first communication group, the number of terminals in the first communication group, and the service attribute parameter of the first communication group. The service attribute parameter of the first communication group includes at least one of the following items: data packet size, packet sending frequency, transmission reliability, transmission rate, and transmission delay.

Embodiments of this application do not limit how to determine the available transmission resources of the first communication group, and an appropriate resource allocation manner may be adopted.

In addition, when the second communication device in the second communication group determines the available transmission resources of the first communication group, the first transmission resource set may be generated based on the available transmission resources of the first communication group, or based on unavailable transmission resources of the first communication group, which is not limited in the embodiments of this application.

In S403, the second communication device in the second communication group sends second indication information to the first communication device in the first communication group, where the second indication information is used for determining the first transmission resource set of the first communication group, and transmission resource sets are different among the communication groups within the communication range of the first communication group.

In S404, the first communication device in the first communication group determines the first transmission resource set according to the second indication information.

In S405, the first communication device in the first communication group determines the transmission resources of the communication devices in the first communication group according to the first transmission resource set of the first communication group, where the transmission resource sets are different among respective communication groups within the communication range of the first communication group.

In S406, the first communication device in the first communication group sends first indication information to the communication devices in the first communication group, where the first indication information is used for indicating transmission resources of the communication devices in the first communication group.

The technical terms, technical effects, technical features, and optional implementations of S403-S406 can be understood with reference to S301-S304 shown in FIG. 8, and repeated content will not be elaborated here.

In S407, the second communication device in the second communication group updates a second transmission resource set of the second communication group according to the first transmission resource set.

In S408, the second communication device in the second communication group sends third indication information to the communication devices in the second communication group, where the third indication information is used for indicating the changed transmission resources of the communication devices in the second communication group.

In this step, after the second communication device in the second communication group allocates transmission resources to the first communication group, in order to prevent the communication devices in the second communication group from using the transmission resources allocated to the first communication group, the second transmission resource set of the second communication group may be updated according to the first transmission resource set.

In addition, in some embodiments, the control terminal of all communication groups may not only be the cluster header of a certain communication group, but also may be a peripheral terminal that does not belong to any communication group. The cluster headers of respective communication groups may send the resource change request to the peripheral terminal, and allocate transmission resources to the terminals in the respective communication groups according to the allocated transmission resources.

In some embodiments of this application, by dynamically allocating transmission resources to each communication group on demand, transmission resources can be flexibly multiplexed among respective communication groups, thereby improving the efficiency of resource utilization.

According to the communication method provided by the embodiments of this application, which may be applied to the first communication device in the first communication group, the transmission resources of communication devices in the first communication group are determined according to the first transmission resource set of the first communication group, where transmission resource sets are different between respective communication groups within the communication range of the first communication group. Then, the first indication information is sent to the communication devices in the first communication group, where the first indication information is used for indicating transmission resources of the communication devices in the first communication group. Compared with the related art, since the transmission resource sets are different among the respective communication groups, resource coordination can be realized among the communication groups, thereby avoiding the interference between the communication groups.

It should be understood by those of ordinary skill in the art that all or part of the steps of implementing the above method embodiments can be completed by hardware related to program information, and the program may be stored in a computer-readable storage medium. When the program is used for, when being executed, implementing the steps of the above method embodiments. The aforementioned storage medium may include: ROM, RAM, magnetic disk, optical disk, or other medium that can store program codes.

Figure 10:
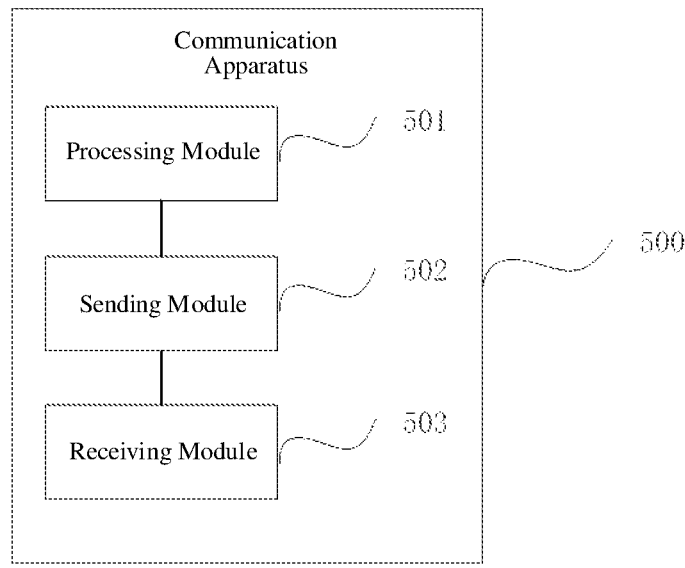
FIG. 10 is a block diagram of a communication apparatus according to some embodiments of this application.

FIG. 10 is a block diagram of a communication apparatus according to some embodiments of this application. The communication apparatus may be implemented by software, hardware, or a combination thereof, so as to execute the communication method on the side of the first communication device in the first communication group according to the foregoing embodiments. As shown in FIG. 10, the communication apparatus 500 includes a processing module 501, a sending module 502 and a receiving module 503.

The processing module is configured to determine, according to a first transmission resource set of the first communication group, transmission resources of communication devices in the first communication group, where transmission resource sets are different between respective communication groups within a communication range of the first communication group.

The sending module is configured to send first indication information to the communication devices in the first communication group, where the first indication information is used for indicating the transmission resources of the communication devices in the first communication group.

In some embodiments, the processing module is further configured to acquire pre-configuration information of the communication apparatus; and determine the first transmission resource set according to the pre-configuration information of the communication apparatus.

In some embodiments, the preconfigured information includes at least one of: a number of terminals in the first communication group, a type of the terminals in the first communication group, a service attribute parameter of the first communication group.

In some embodiments, the apparatus further includes:
the receiving module, configured to receive second indication information sent by a second communication device in a second communication group, where the second indication information includes available transmission resources of the first communication group; and
where the processing module is further configured to determine the first transmission resource set according to the second indication information.

In some embodiments, the second indication information is carried in broadcast information, system information, RRC signaling or control signaling.

In some embodiments, the receiving module is further configured to receive synchronization signal and the broadcast information sent by the second communication device in the second communication group.

In some embodiments, the sending module is further configured to send a resource change request to the second communication device in the second communication group, where the resource change request is used for requesting, changing or cancelling the transmission resources of the first communication group, and the resource change request includes information on the first communication group.

In some embodiments, the information on the first communication group includes at least one of: identification information of the first communication group, identification information of a first communication device in the first communication group, a number of terminals in the first communication group, and a service attribute parameter of the first communication group.

In some embodiments, the service attribute parameter of the first communication group includes at least one of: data packet size, packet sending frequency, transmission reliability, transmission rate and transmission delay.

In some embodiments, the first transmission resource set is used for indicating available transmission resources of the first communication group or unavailable transmission resources of the first communication group.

In some embodiments, the first transmission resource set includes time domain resource information and/or frequency-domain resource information.

The communication apparatus according to some embodiments of this application can perform the actions of the communication method on the side of the first communication device in the first communication group according to the foregoing embodiments, and the implementation principle and technical effect thereof are similar, and are not repeated here.

Figure 11:
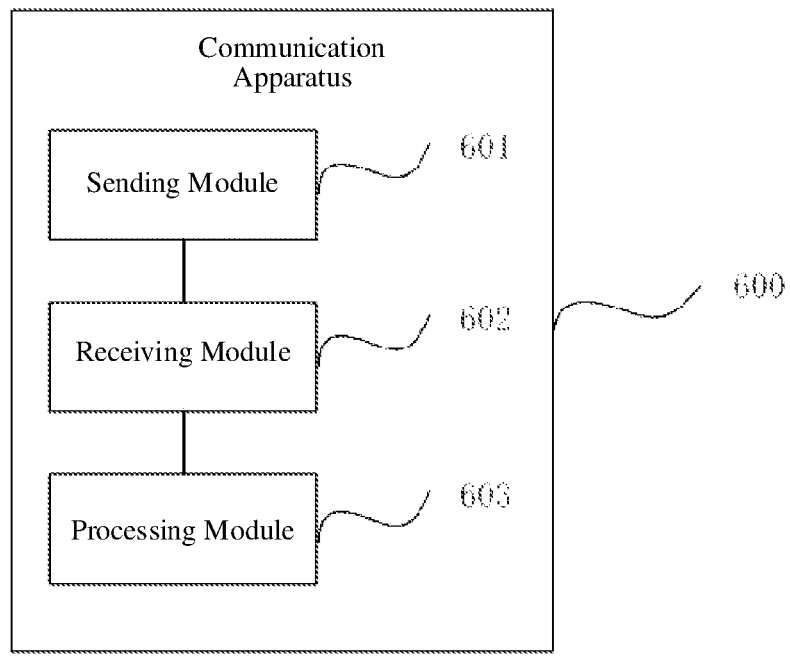
FIG. 11 is a block diagram of a communication apparatus according to some embodiments of this application.

FIG. 11 is a block diagram of a communication apparatus according to some embodiments of this application. The communication apparatus may be implemented by software, hardware, or a combination thereof, so as to implement the communication method on the side of the second communication device in the second communication group according to the foregoing embodiments. As shown in FIG. 11, the communication apparatus 600 includes a sending module 601, a receiving module 602 and a processing module 603.

The sending module 601 is configured to send second indication information to a first communication device in a first communication group, where the second indication information is used for determining first transmission resource set of the first communication group, and transmission resource sets are different between respective communication groups within a communication range of the first communication group.

In some embodiments, the second indication information is carried in broadcast information, system information, RRC signaling or control signaling.

In some embodiments, the apparatus further includes:
the receiving module 602, configured to receive a resource change request sent by the first communication device in the first communication group, where the resource change request is used for requesting, changing or cancelling transmission resources of the first communication group, and the resource change request includes information on the first communication group; and
the processing module 603, configured to determine, according to the information on the first communication group, available transmission resources of the first communication group.

In some embodiments, the information on the first communication group includes at least one of: identification information of the first communication group, identification information of the first communication device in the first communication group, a number of terminals in the first communication group, and a service attribute parameter of the first communication group.

In some embodiments, the service attribute parameter of the first communication group includes at least one of: data packet size, packet sending frequency, transmission reliability, transmission rate and transmission delay.

In some embodiments, the processing module 603 is further configured to update a second transmission resource set of the second communication group according to the first transmission resource set; and
where the sending module 601 is further configured to send third indication information to communication devices in the second communication group, where the third indication information is used for indicating updated transmission resources of the communication devices in the second communication group.

In some embodiments, the first transmission resource set is used for indicating available transmission resources of the first communication group or unavailable transmission resources of the first communication group.

In some embodiments, the first transmission resource set includes time domain resource information and/or frequency-domain resource information.

The communication apparatus according to some embodiments of this application can perform the actions of the communication method on the side of the second communication device in the second communication group according to the foregoing embodiments, and the implementation principle and technical effect thereof are similar, and are not repeated here.

Figure 12:
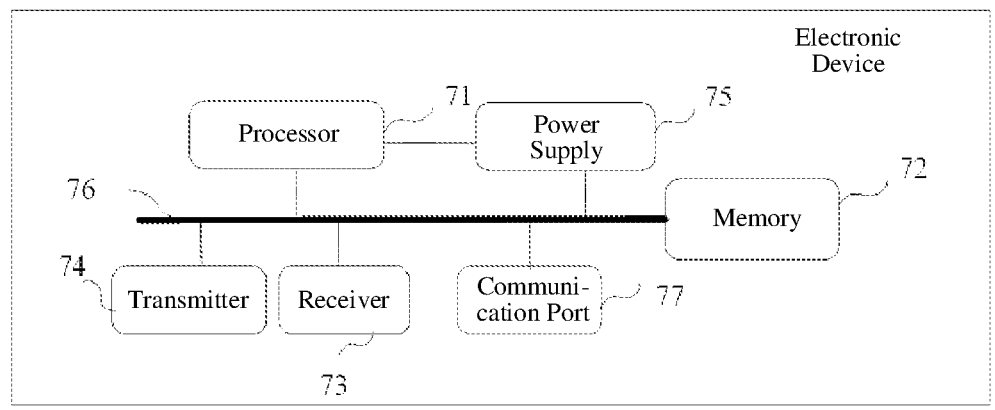
FIG. 12 is a block diagram of an electronic device according to some embodiments of this application.

FIG. 12 is a block diagram of an electronic device according to some embodiments of this application. As shown in FIG. 12, the electronic device may include: a processor 71 (e.g., a CPU), a memory 72, a receiver 73 and a transmitter 74; the receiver 73 and the transmitter 74 are coupled to the processor 71, the processor 71 controls receiving operation of the receiver 73, and the processor 71 controls sending operation of the transmitter 74. The memory 72 may include a high-speed RAM memory, and may also include a non-volatile memory (NVM), such as at least one magnet disk memory, and various information may be stored in the memory 72 for completing various processing functions and implementing steps of the method embodiments of this application. Optionally, the electronic device involved in the embodiments of this application may further include: a power supply 75, a communication bus 76 and a communication port 77. The receiver 73 and the transmitter 74 may be integrated in the transceiver of the electronic device, or may be independent transceiver antennas of the electronic device. The communication bus 76 is configured to enable communication connections between various elements. The above-mentioned communication port 77 is configured to realize connection and communication between the electronic device and other peripheral devices.

In some embodiment of this application, the above-mentioned memory 72 is configured to store computer-executable program codes, and the program codes include information: when the processor 71 executes the information, the information causes the processor 71 to perform the processing actions on the side of the first communication device in the first communication group according to the foregoing method embodiments, causes the transmitter 74 to perform the sending actions on the side of the first communication device in the first communication group according to the foregoing method embodiments, and causes the receiver 73 to perform the receiving actions on the side of the first communication device in the first communication group according to the foregoing method embodiments, while the implementation principle and technical effect thereof are similar, and are not repeated here.

Alternatively, when the processor 71 executes the information, the information causes the processor 71 to perform the processing actions on the side of the second communication device in the second communication group according to the foregoing method embodiments, causes the transmitter 74 to perform the sending actions on the side of the second communication device in the second communication group according to the foregoing method embodiments, and causes the receiver 73 to perform the receiving actions on the side of the second communication device in the second communication group according to the foregoing method embodiments, while the implementation principle and technical effect thereof are also similar, and are not repeated here.

Embodiments of this application further provide a communication system, including a second communication group and at least one first communication group, so as to perform the above communication method.

Embodiments of this application further provides a chip, including a processor and an interface. The interface is configured to input and output data or instructions processed by the processor. The processor is configured to execute the methods provided in the above method embodiments. The chip may be applied to the first communication device in the first communication group or the second communication device in the second communication group.

This application further provides a computer-readable storage medium, the computer-readable storage medium may include a U disk, a mobile hard disk, a read-only memory (ROM), a random access memory (RAM), a magnetic disk, an optical disk and other medium that can store program codes. Specifically, the computer-readable storage medium stores program information, and the program information is used for the above communication method.

Embodiments of this application further provides a program, which is used for implementing the communication method according to the above method embodiments when the program is executed by a processor.

Embodiments of this application further provide a program product, such as a computer-readable storage medium, where instructions are stored in the program product, and when the program product runs on a computer, the computer executes the communication method according to the above method embodiments.

The above-mentioned embodiments may be implemented in whole or in part by software, hardware, firmware or any combination thereof. When implemented by software, it may be implemented in whole or in part in the form of a computer program product. The computer program product includes one or more computer instructions. When the computer program instructions are loaded and executed on a computer, the procedures or functions according to the embodiments of this application are generated in whole or in part. The computer may be a general purpose computer, a special purpose computer, a computer network, or other programmable device. Computer instructions may be stored in a computer-readable storage medium or transmitted from one computer-readable storage medium to another computer-readable storage medium, for example, the computer instructions may be transmitted from a website site, computer, server or data center via wired (e.g., coaxial cable, optical fiber, digital subscriber line (DSL)) or wireless (e.g., infrared, wireless, microwave, and the like) means to another website site, computer, server or data center. The computer-readable storage medium may be any available medium that a computer can access, or a data storage device such as a server, a data center, or the like that includes one or more available medium integrated. Available medium may be magnetic medium (e.g., floppy disks, hard disks, magnetic tapes), optical medium (e.g., DVD), or semiconductor medium (e.g., solid state disk (SSD)), or the like.

Finally, it should be noted that the above embodiments are only used to illustrate the technical solutions of this application, but not to limit them. Although this application has been described in detail with reference to the foregoing embodiments, it should be understood by those of ordinary skill in the art that the technical solutions described in the foregoing embodiments may still be modified, or some or all of the technical features thereof may be equivalently replaced; and these modifications or replacements do not make the essence of the corresponding technical solutions deviate from the scope of the technical solutions according to the embodiments of this application.

What is claimed is:

1. A communication method, characterized by being applied to a second communication device in a second communication group and comprising:
   sending second indication information to a first communication device in a first communication group, wherein the second indication information is used for determining first transmission resource set of the first communication group, and transmission resource sets are different between respective communication groups within a communication range of the first communication group;
   wherein in a short-range communication system where the first communication group and the second communication group are located,
   a radio frame comprises 8 orthogonal frequency division multiplexing (OFDM) symbols, the 8 OFDM symbols are divided into a symbol on C-link and a symbol on T-link, a cluster header in the first communication group or the second communication group sends data to an intragroup communication device through the C-link, and the intragroup communication device in the first communication group or the second communication group sends data to the cluster header through the T-link.

2. The method as claimed in claim 1, wherein the second indication information is carried in broadcast information, or system information.

3. The method as claimed in claim 1, wherein the first transmission resource set is used for indicating available transmission resources of the first communication group.

4. The method as claimed in claim 3, wherein the first transmission resource set comprises time domain resource information and/or frequency-domain resource information.

5. The method as claimed in claim 1, wherein sending the second indication information to the first communication device in the first communication group comprises:
   sending synchronization signal and broadcast information to the first communication device in the first communication group, wherein the second indication information is carried in the broadcast information.

6. The method as claimed in claim 1, wherein the symbol on C-link is located at beginning of the radio frame, the symbol on T-link is located at end of the radio frame, and a guard period (GP) is between the symbol on C-link and the symbol on T-link.

7. A communication apparatus, comprising:
   a transceiver, configured to send second indication information to a first communication device in a first communication group, wherein the second indication information is used for determining first transmission resource set of the first communication group, and transmission resource sets are different between respective communication groups within a communication range of the first communication group;
   wherein in a short-range communication system where the first communication group and the second communication group are located,
   a radio frame comprises 8 orthogonal frequency division multiplexing (OFDM) symbols, the 8 OFDM symbols are divided into a symbol on C-link and a symbol on T-link, a cluster header in the first communication group or the second communication group sends data to an intragroup communication device through the C-link, and the intragroup communication device in the first communication group or the second communication group sends data to the cluster header through the T-link.

8. The apparatus as claimed in claim 7, wherein the second indication information is carried in broadcast information, or system information.

9. The apparatus as claimed in claim 7, wherein the first transmission resource set is used for indicating available transmission resources of the first communication group.

10. A communication method, being applied to a first communication device in a first communication group and comprising:
determining, according to a first transmission resource set of the first communication group, transmission resources of communication devices in the first communication group, wherein transmission resource sets are different between respective communication groups within a communication range of the first communication group; and
sending first indication information to the communication devices in the first communication group, wherein the first indication information is used for indicating the transmission resources of the communication devices in the first communication group,
wherein the method further comprises:
receiving second indication information sent by a second communication device in a second communication group, wherein the second indication information comprises available transmission resources of the first communication group; and
determining the first transmission resource set according to the second indication information;
wherein in a short-range communication system where the first communication group and the second communication group are located,
a radio frame comprises 8 orthogonal frequency division multiplexing (OFDM) symbols, the 8 OFDM symbols are divided into a symbol on C-link and a symbol on T-link, a cluster header in the first communication group or the second communication group sends data to an intragroup communication device through the C-link, and the intragroup communication device in the first communication group or the second communication group sends data to the cluster header through the T-link.

11. The method as claimed in claim 10, wherein the second indication information is carried in broadcast information, or system information.

12. The method as claimed in claim 10, wherein the first transmission resource set is used for indicating available transmission resources of the first communication group.

13. The method as claimed in claim 12, wherein the first transmission resource set comprises time domain resource information and/or frequency-domain resource information.

14. The method as claimed in claim 10, wherein receiving the second indication information sent by the second communication device in the second communication group comprises:
receiving synchronization signal and broadcast information sent by the second communication device in the second communication group, and the second indication information is carried in the broadcast information.

15. The method as claimed in claim 10, wherein the symbol on C-link is located at beginning of the radio frame, the symbol on T-link is located at end of the radio frame, and a guard period (GP) is between the symbol on C-link and the symbol on T-link.

16. A communication apparatus, comprising:
a processor, configured to determine, according to a first transmission resource set of the first communication group, transmission resources of communication devices in the first communication group, wherein transmission resource sets are different between respective communication groups within a communication range of the first communication group; and
a transceiver, configured to send first indication information to the communication devices in the first communication group, wherein the first indication information is used for indicating the transmission resources of the communication devices in the first communication group,
wherein the transceiver is further configured to receive second indication information sent by a second communication device in a second communication group, wherein the second indication information comprises available transmission resources of the first communication group; and
wherein the processor is further configured to determine the first transmission resource set according to the second indication information;
wherein in a short-range communication system where the first communication group and the second communication group are located,
a radio frame comprises 8 orthogonal frequency division multiplexing (OFDM) symbols, the 8 OFDM symbols are divided into a symbol on C-link and a symbol on T-link, a cluster header in the first communication group or the second communication group sends data to an intragroup communication device through the C-link, and the intragroup communication device in the first communication group or the second communication group sends data to the cluster header through the T-link.

17. The apparatus as claimed in claim 16, wherein the second indication information is carried in broadcast information, or system information.

18. The apparatus as claimed in claim 16, wherein the first transmission resource set is used for indicating available transmission resources of the first communication group.

* * * * *